United States Patent
Matsuo

(10) Patent No.: US 12,477,221 B2
(45) Date of Patent: Nov. 18, 2025

(54) CONTROL APPARATUS, CONTROL METHOD, AND IMAGE CAPTURE APPARATUS

(71) Applicant: CANON KABUSHIKI KAISHA, Tokyo (JP)

(72) Inventor: Yasuhiro Matsuo, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 18/426,745

(22) Filed: Jan. 30, 2024

(65) Prior Publication Data

US 2024/0267621 A1 Aug. 8, 2024

(30) Foreign Application Priority Data

Feb. 7, 2023 (JP) .................................. 2023-017007

(51) Int. Cl.
*H04N 23/67* (2023.01)
*H04N 5/262* (2006.01)

(52) U.S. Cl.
CPC ........... *H04N 23/675* (2023.01); *H04N 5/262* (2013.01)

(58) Field of Classification Search
CPC ...... H04N 23/675; H04N 5/262; H04N 23/60; H04N 23/671; H04N 5/2224; H04N 5/275; H04N 23/67; G03B 3/10; G03B 13/20; G03B 13/36

See application file for complete search history.

(56) References Cited

U.S. PATENT DOCUMENTS

| 7,259,747 B2* | 8/2007 | Bell ..................... H04N 23/20 |
| | | 345/157 |
| 2020/0145644 A1* | 5/2020 | Cordes ................... H04N 5/272 |
| 2023/0247288 A1* | 8/2023 | Sakurabu ............. H04N 23/675 |

FOREIGN PATENT DOCUMENTS

| CN | 112311965 A | 2/2021 |
| JP | 2022-102923 A | 7/2022 |

OTHER PUBLICATIONS

The above document was cited in a British Search Report issued on Jun. 24, 2024, which is enclosed, that issued in the corresponding British Patent Application No. GB2400904.5.
Supplementary Disclosures: "Virtual shooting method, device and system and storage medium", Jun. 21, 2024 (4 pages).

\* cited by examiner

*Primary Examiner* — Gevell V Selby
(74) *Attorney, Agent, or Firm* — Cowan, Liebowitz & Latman, P.C.

(57) ABSTRACT

A control apparatus for controlling an image capture apparatus is disclosed The apparatus (i) if the target focus distance is longer than a first distance that is a distance between the image capture apparatus and a display apparatus provided in a captured area of the image capture apparatus, controls a focus distance of the image capture apparatus such that the image capture apparatus is in-focus at a second distance determined based on the first distance, and (ii) if the target focus distance is shorter than or equal to the first distance, controls the focus distance of the image capture apparatus such that the image capture apparatus is in-focus at the target focus distance.

19 Claims, 12 Drawing Sheets

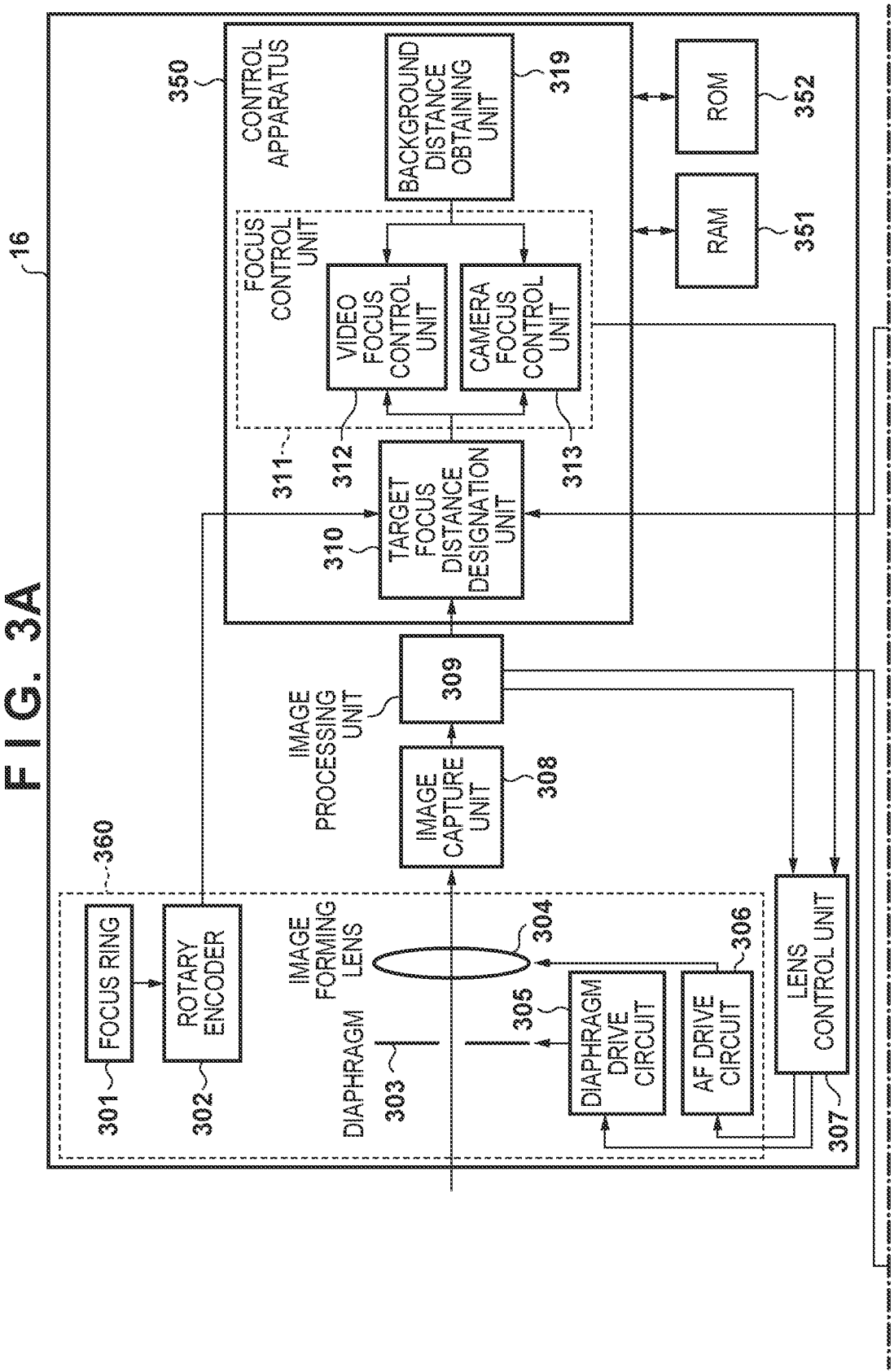

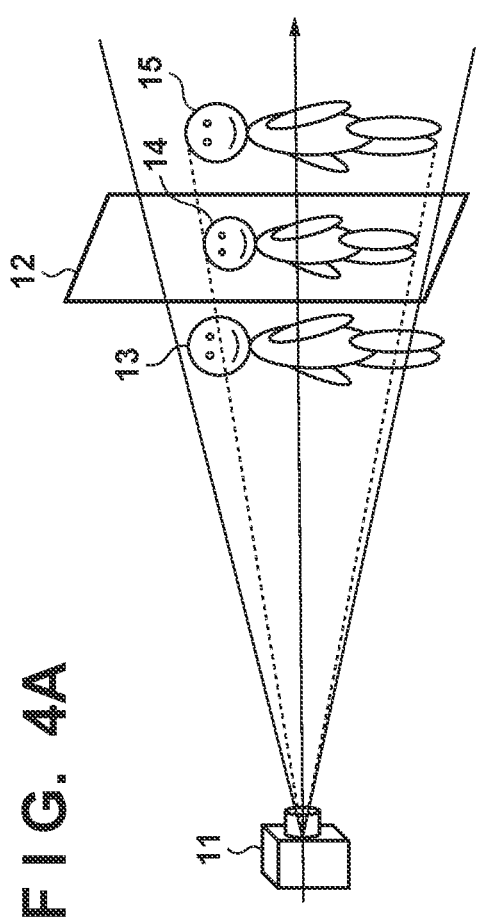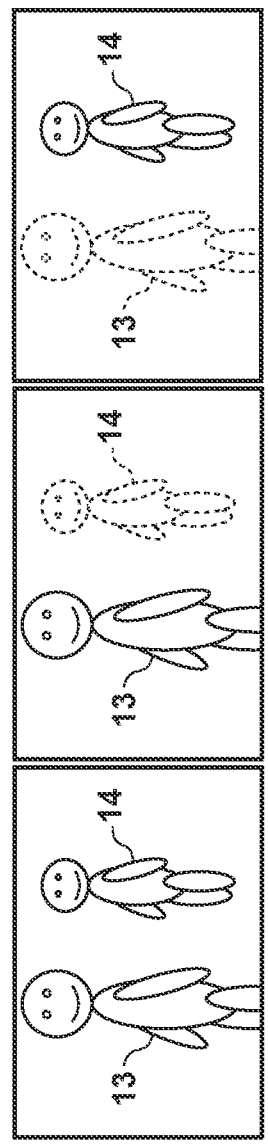

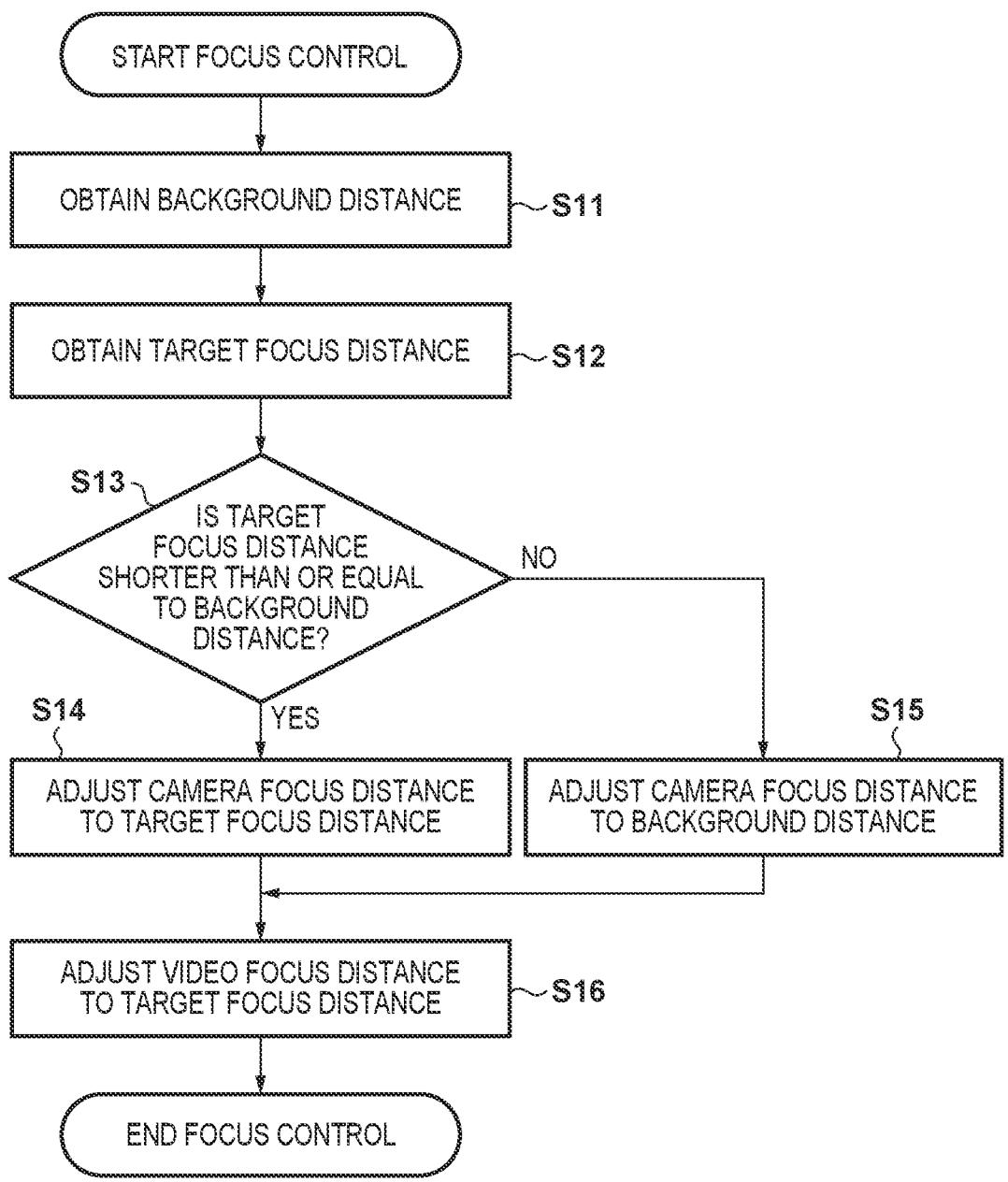

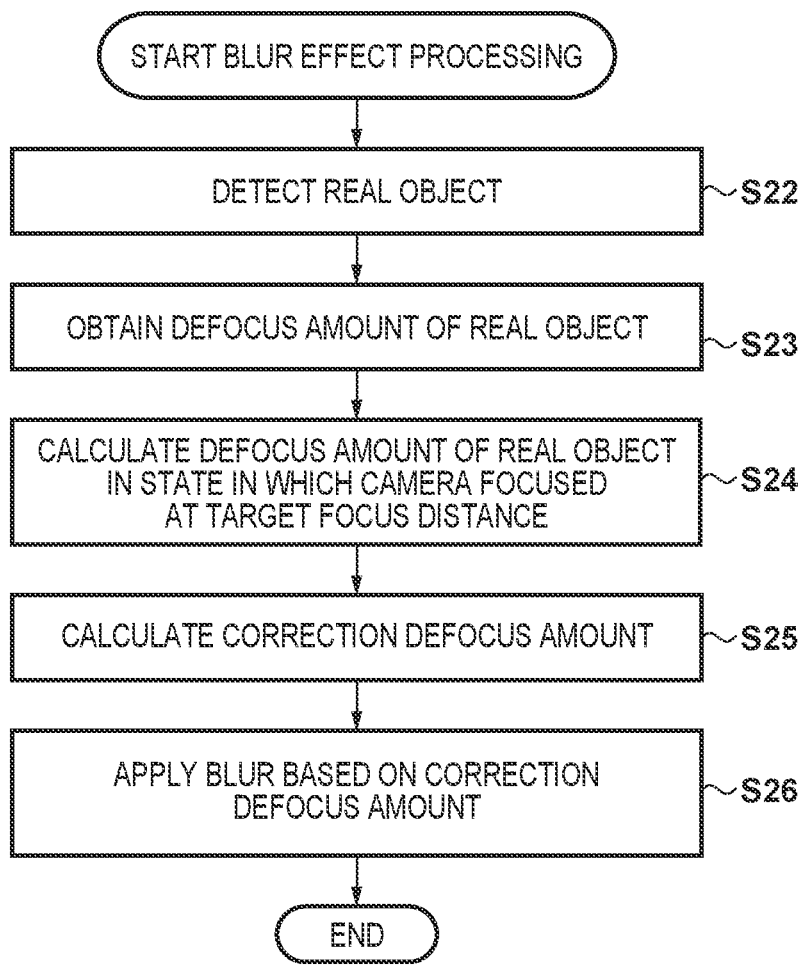

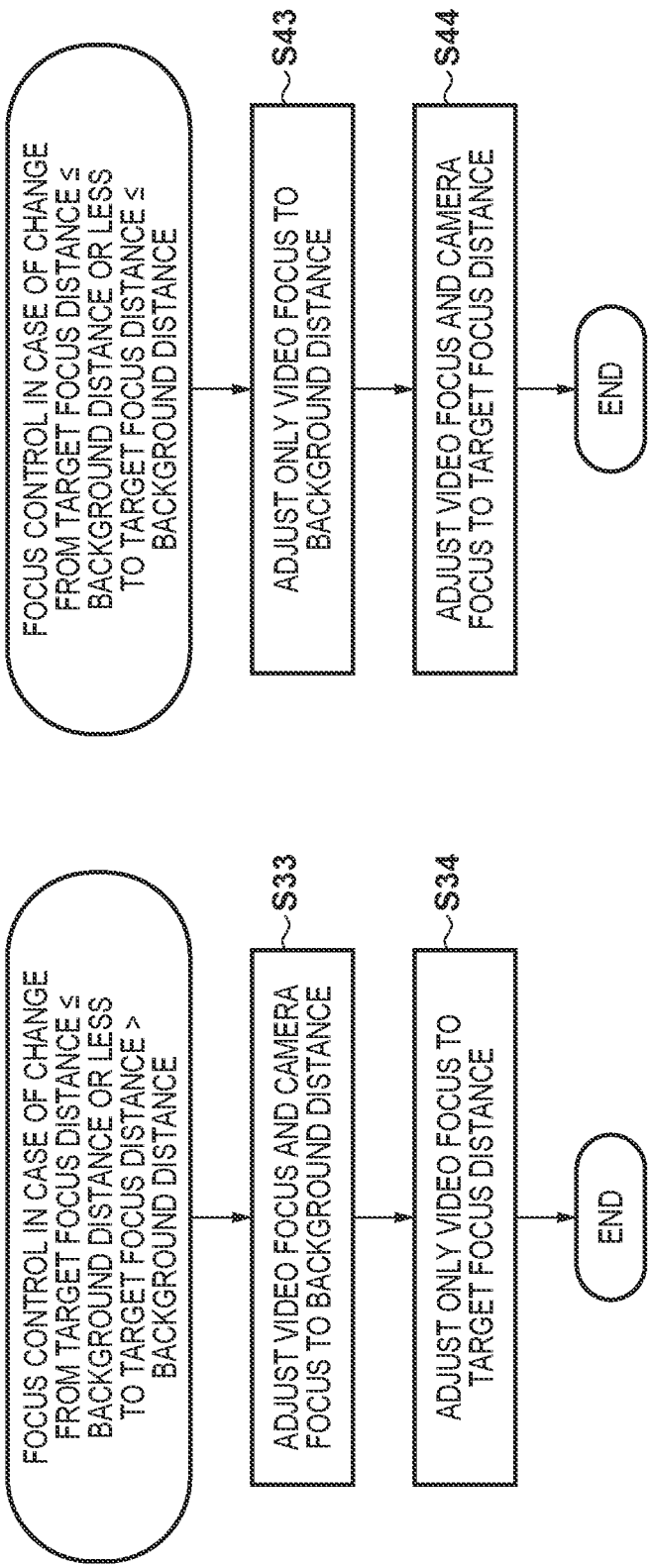

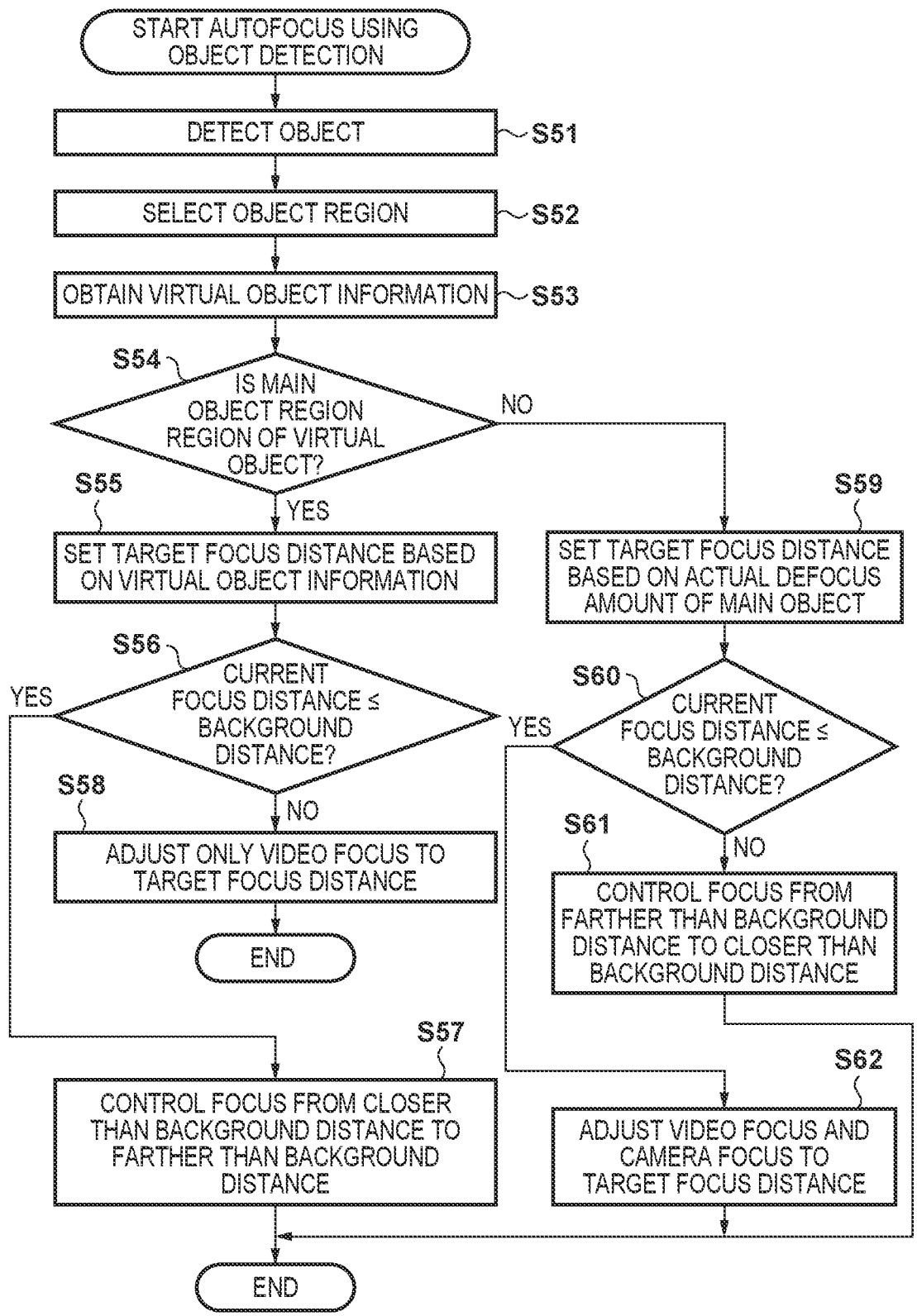

CONTROL APPARATUS, CONTROL METHOD, AND IMAGE CAPTURE APPARATUS

TECHNICAL FIELD

The present disclosure relates to a control apparatus, a control method, and an image capture apparatus, and in particular relates to a technique for controlling a focus distance.

BACKGROUND

Description of the Related Art

In-camera VFX is a known technique for obtaining a visual effects (VFX) video without combining a background image and a live video. The technique involves capturing a video of an object whose background is a display apparatus that displays a background image according to the position and orientation of the camera. In addition, Japanese Patent Laid-Open No. 2022-102923 discloses a virtual studio system for generating a background image on which a focus operation and a zoom operation of a camera, in addition to the position and orientation of the camera, are reflected.

With the technique in Japanese Patent Laid-Open No. 2022-102923, for example, a focus operation for setting the focus of the camera to a farther area than a display apparatus is not envisioned.

SUMMARY

In view of such an issue of the conventional technique, a mode of the present disclosure provides a control apparatus and a control method that can appropriately control a focus distance of an image capture apparatus in accordance with a focus distance of a background image.

According to an aspect of the present invention, there is provided a control apparatus for controlling an image capture apparatus, the control apparatus comprising: one or more processors that execute a program stored in a memory and thereby function as: an obtaining unit configured to obtain a target focus distance, and a control unit, wherein the control unit is configured to: if the target focus distance is longer than a first distance between the image capture apparatus and a display apparatus provided in a captured area of the image capture apparatus, control a focus distance of the image capture apparatus such that the image capture apparatus is in-focus at a second distance determined based on the first distance, and if the target focus distance is shorter than or equal to the first distance, control the focus distance of the image capture apparatus such that the image capture apparatus is in-focus at the target focus distance.

According to another aspect of the present invention, there is provided a control apparatus, comprising: one or more processors that execute a program stored in a memory and thereby function as: a control unit configured to control image capturing that is performed by an image capture apparatus and image displaying that is performed by a display apparatus provided in a captured area of the image capture apparatus, wherein the control unit controls a focus distance in the image capturing not to be longer than a first distance corresponding to a distance between the image capture apparatus and the display apparatus.

According to a further aspect of the present invention, there is provided a control apparatus, comprising: one or more processors that execute a program stored in a memory and thereby function as: an obtaining unit configured to obtain a target focus distance, and a control unit configured to control image capturing that is performed by an image capture apparatus and image displaying that is performed by a display apparatus provided in a captured area of the image capture apparatus, wherein the control unit includes: a generating unit configured to generate a video to be displayed on the display apparatus, using the target focus distance, and wherein the control unit controls, in accordance with the target focus distance, (i) a focus distance of the image capture apparatus, (ii) a blur effect applied to a video to be displayed on the display apparatus, and (iii) a blur effect applied to a region of an object in a video captured by the image capture apparatus, the region being different from that of the display apparatus.

According to another aspect of the present invention, there is provided an image capture apparatus comprising: an image sensor; an image processing circuit that processes a video captured by the image sensor; and a control apparatus that controls a focus distance of the image capture apparatus, wherein the control apparatus comprises: one or more processors that execute a program stored in a memory and thereby function as: an obtaining unit configured to obtain a target focus distance, and a control unit, wherein the control unit is configured to: if the target focus distance is longer than a first distance between the image capture apparatus and a display apparatus provided in a captured area of the image capture apparatus, control a focus distance of the image capture apparatus such that the image capture apparatus is in-focus at a second distance determined based on the first distance, and if the target focus distance is shorter than or equal to the first distance, control the focus distance of the image capture apparatus such that the image capture apparatus is in-focus at the target focus distance.

According to a further aspect of the present invention, there is provided a control method of an image capture apparatus, the method comprising: obtaining a target focus distance; if the target focus distance is longer than a first distance between the image capture apparatus and a display apparatus provided in a captured area of the image capture apparatus, controlling a focus distance of the image capture apparatus such that the image capture apparatus is in-focus at a second distance determined based on the first distance; and if the target focus distance is shorter than or equal to the first distance, controlling the focus distance of the image capture apparatus such that the image capture apparatus is in-focus at the target focus distance.

According to another aspect of the present invention, there is provided a control method for controlling image capturing that is performed by an image capture apparatus and image displaying that is performed by a display apparatus provided in a captured area of the image capture apparatus, the method comprising: controlling a focus distance in the image capturing not to be longer than a first distance corresponding to a distance between the image capture apparatus and the display apparatus.

According to a further aspect of the present invention, there is provided a control method comprising: obtaining a target focus distance; and controlling image capturing that is performed by an image capture apparatus and image displaying that is performed by a display apparatus provided in a captured area of the image capture apparatus, wherein the controlling includes: generating a video to be displayed on the display apparatus, using the target focus distance, and controlling, in accordance with the target focus distance, (i) a focus distance of the image capture apparatus, (ii) a blur effect applied to a video to be displayed on the display apparatus, and (iii) a blur effect applied to a region of an object in a video captured by the image capture apparatus, the region being different from that of the display apparatus.

According to another aspect of the present invention, there is provided a non-transitory computer-readable medium, for storing a program which, when executed by a computer, causes the computer to function as a control apparatus comprising: an obtaining unit configured to obtain a target focus distance, and a control unit, wherein the control unit is configured to: if the target focus distance is longer than a first distance between the image capture apparatus and a display apparatus provided in a captured area of the image capture apparatus, control a focus distance of the image capture apparatus such that the image capture apparatus is in-focus at a second distance determined based on the first distance, and if the target focus distance is shorter than or equal to the first distance, control the focus distance of the image capture apparatus such that the image capture apparatus is in-focus at the target focus distance.

Further features of the present disclosure will become apparent from the following description of exemplary embodiments (with reference to the attached drawings).

BRIEF DESCRIPTION OF THE DRAWINGS

FIGS. 3A and 3B are block diagrams showing another exemplary functional configuration of devices that realize the virtual studio according to the first embodiment.

FIGS. 4A to 4D are diagrams showing an example of an in-camera VFX video that is obtained in a virtual studio according to an embodiment of the present disclosure.

FIG. 5 is a flowchart related to a control operation of a focus distance according to an embodiment of the present disclosure.

FIG. 6 is a flowchart related to a blurring operation according to an embodiment of the present disclosure.

FIGS. 7A and 7B are flowcharts related to a variation of a control operation of a focus distance according to an embodiment of the present disclosure.

FIG. 10 is a flowchart related to a control operation of a focus distance according to the second embodiment.

DETAILED DESCRIPTION

Figure 1A:
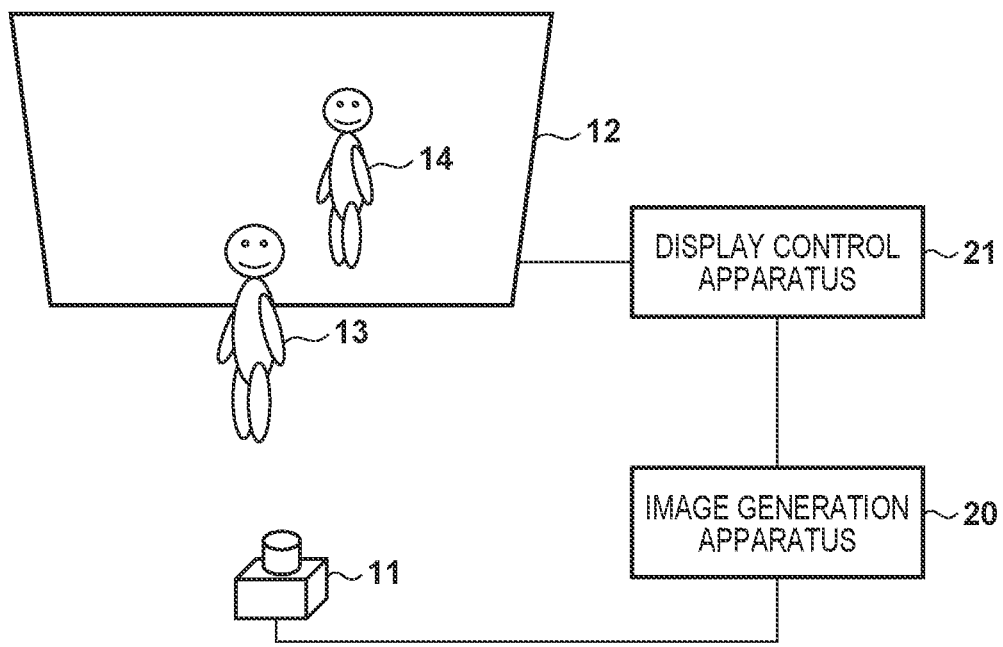
FIGS. 1A and 1B are schematic diagrams of a virtual studio according to an embodiment of the present disclosure.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

Note that, in the following embodiments, cases will be described in which embodiments of the present disclosure is carried out with a digital camera. However, embodiments of the present disclosure can also be carried out with any electronic device that includes a camera that can control a focus distance. Examples of such an electronic device include computer devices (personal computers, tablet computers, media players, PDAs, and the like), smartphones, game machines, robots, drones, and the like as well as image capture apparatuses. These are exemplary, and embodiments of the present disclosure can also be carried out with another electronic device.

First Embodiment

With the technique in Japanese Patent Laid-Open No. 2022-102923, for example, when a focus operation for setting a focus on a farther area than a display apparatus is performed, a background image on which the focus operation is reflected is generated. However, a camera is not focused on the display apparatus displaying the background image, and thus there is a problem in that an appropriate VFX video cannot be obtained. In view of this, the present embodiment provides a system that can obtain an appropriate VFX video even when capturing an image focused on a farther area than a display apparatus, by appropriately controlling a focus distance of a background image and a focus distance of an image capture apparatus. As will be described later, the focus distance of the background image is a focus distance of a (virtual) camera that is used when generating the background image.

Overview of Virtual Studio

Figure 1B:
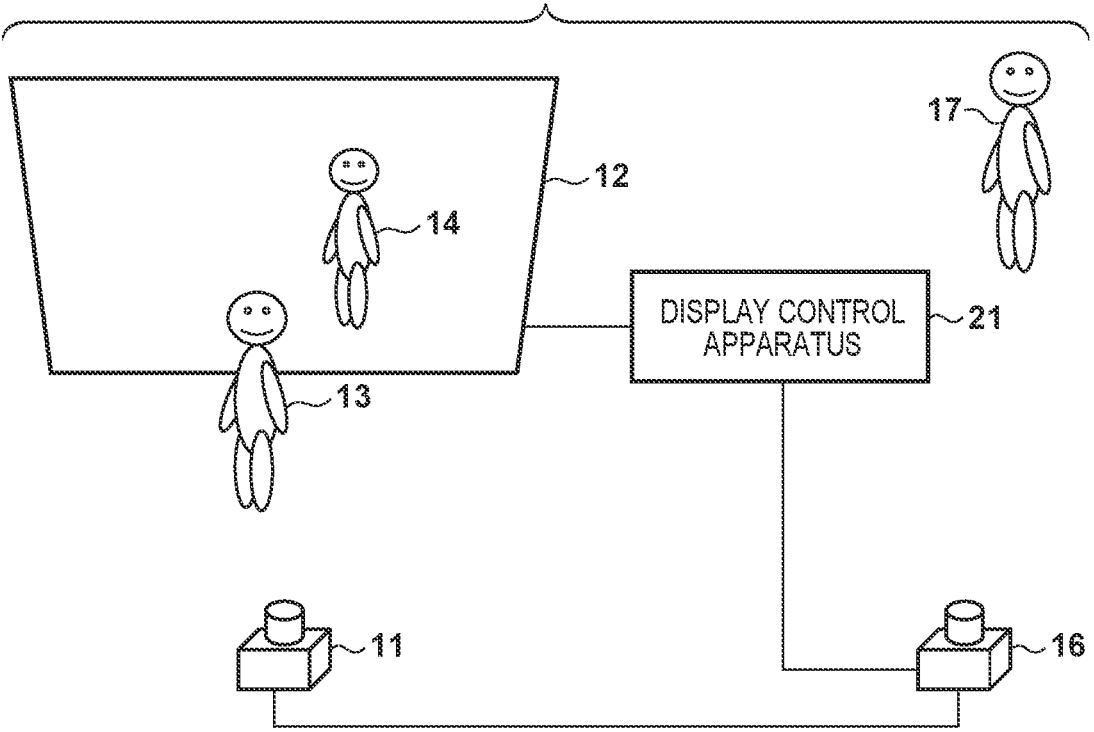

FIGS. 1A and 1B are schematic diagrams of a virtual studio according to an embodiment of the present disclosure. FIG. 1A shows a case where a background image is generated using computer graphics (CG), and FIG. 1B shows a case where a background image is generated through image capturing. In both cases, the virtual studio includes at least a camera 11 for capturing a VFX video, and a display apparatus 12 that is provided in the captured area of the camera 11, and displays a background image. In addition, hereinafter, an object 13 between the display apparatus 12 and the camera 11 is referred to as a "real object", and an object 14 included in the background image displayed on the display apparatus 12 is referred to as a "virtual object". Note that, in the following description, for convenience, a person object is envisioned, but a type of object is not limited.

With the configuration in FIG. 1A, an image generation apparatus 20 generates a computer graphics (CG) background image that is based on the position and orientation of the camera 11. The image generation apparatus 20 may be a computer on which real-time 3D image generating software called a "game engine" runs, for example. A display control apparatus 21 causes the display apparatus 12 to display a background image generated by the image generation apparatus 20. The display control apparatus 21 causes the background image to be displayed in accordance with an image capture timing of the camera 11. In addition, if the display apparatus 12 is constituted by a plurality of display panels, the background image is divided based on the individual display panels. In FIG. 1A, the virtual object 14 is a CG image generated by the image generation apparatus 20 based on a 3D model, for example.

When generating a CG background image, a focus distance is set as a parameter of a virtual camera for capturing an image of a virtual space, and thereby it is possible to generate a background image focused at the set distance. Blurring in the background image is expressed in accordance with optical parameters and shooting parameters (for example, an aperture value) of a virtual lens that is used by the virtual camera.

With the configuration in FIG. 1B, a camera 16 captures a background image that is based on the position and orientation of the camera 11. The display control apparatus 21 causes the display apparatus 12 to display the background image output by the camera 16. Here, assume that the camera 16 has captured the background image that includes a real object 17. Therefore, the virtual object 14 in FIG. 1B is a captured image of the real object 17.

When generating a captured background image, a background image focused at the focus distance of the camera 16 that for capturing a video to be used as a background image is obtained. In addition, the degree of a blur in the background image depends on optical parameters and shooting parameters (such as the aperture value) of a lens used by the camera 16.

Device Configuration

Figure 2:
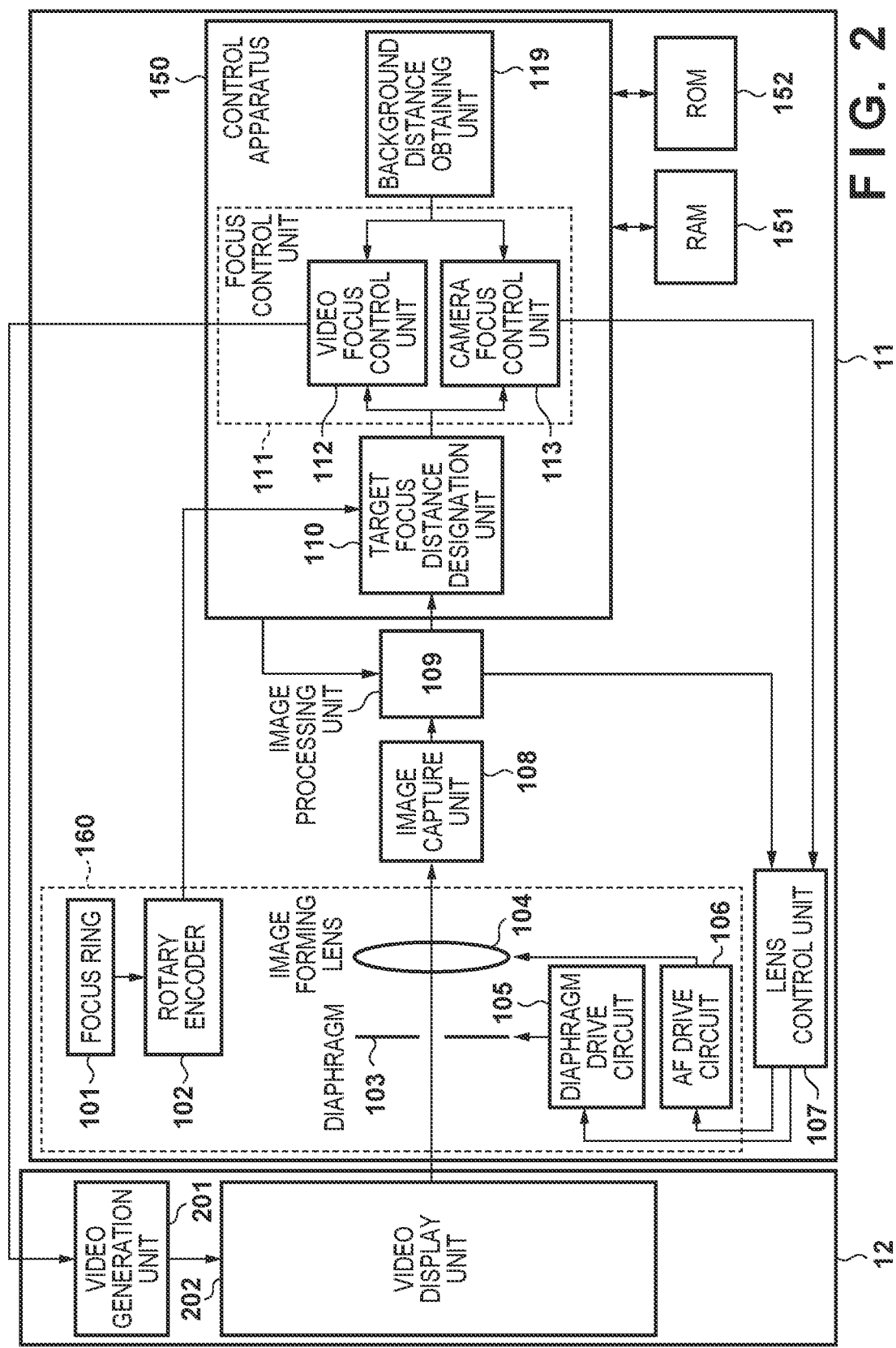
FIG. 2 is a block diagram showing an exemplary functional configuration of devices that realize a virtual studio according to a first embodiment.

FIG. 2 is a block diagram showing an exemplary functional configuration of the devices shown in FIG. 1A. Note that, for ease of description and understanding, in FIG. 2, the display apparatus 12 has functions that are equivalent to the image generation apparatus 20 and the display control apparatus 21. In addition, the camera 11 is fixed at a given position/orientation.

The camera 11 includes a lens unit 160 for generating an optical image of an object on an imaging plane. The lens unit 160 may be an interchangeable lens detachable from the camera 11. In a case where the lens unit 160 is an interchangeable lens, the lens unit 160 and the camera 11 are connected so as to be communicable via a contact point provided on a lens mount.

The opening amount of a diaphragm 103 of the lens unit 160 is changeable, and thus the amount of light entering an image forming lens 104 is adjusted. The opening amount of the diaphragm 103 can be adjusted by a diaphragm drive circuit 105 driving the diaphragm 103 in accordance with control by a lens control unit 107. Note that the opening amount (e.g., aperture value) of the diaphragm 103 can be set based on a result of an operation performed on a diaphragm ring provided in the lens unit 160, or automatic exposure control (AE) processing executed by an image processing unit 109, for example.

The image forming lens 104 is constituted by a plurality of lenses that include movable lenses, and generates an optical image of an object on the imaging plane. The movable lenses include at least a focus lens, or may also include a zoom lens, an image stabilization lens, and the like. The focus distance of the image forming lens 104 (the lens unit 160) depends on the position of the focus lens. The position of the focus lens is detected by the lens unit 160, and can be notified to a control apparatus 150 in accordance with a request, for example.

The position of the focus lens can be adjusted by an AF drive circuit 106 driving the focus lens in accordance with control by the lens control unit 107. Note that the position of the focus lens can be automatically adjusted through automatic focus detection (e.g., autofocus: AF). In addition, the position of the focus lens can also be adjusted in accordance with an amount of operation performed on a focus ring 101 provided in the lens unit (e.g., manual focus: MF).

Here, manual focus is realized using a by-wire method in which the lens control unit 107 controls driving of the focus lens that is based on the amount and the direction of an operation performed on the focus ring 101 detected by a rotary encoder 102. However, a configuration may also be adopted in which the focus ring 101 mechanically drives the focus lens.

In a case where the image forming lens 104 includes movable lenses other than the focus lens such as a zoom lens, a hand shaking correction lens, and the like, the lens unit 160 includes drive circuits for the respective movable lenses. In addition, operations of the drive circuits are controlled by the lens control unit 107.

An image capture unit 108 includes an image sensor, and converts an object image generated by the image forming lens 104 (e.g., the lens unit 160) into image signals. The image sensor may be a known CCD or CMOS color image sensor that includes color filters of the primary color Bayer array, for example. The image sensor includes a pixel array in which a plurality of pixels are two-dimensionally arranged, and a peripheral circuit for reading signals out from the respective pixels. Each of the pixels stores an electric charge that is based on an incident light amount, through photoelectric conversion. By reading, from each pixel, a signal that has a voltage that is based on the electric charge amount stored during an exposure period, a pixel signal group (e.g., analog image signals) representing an object image formed on the imaging plane is obtained.

The image processing unit 109 applies predetermined signal processing and image processing to analog image signals output by the image capture unit 108, generates signals and image data based on intended use, and obtains and/or generates various types of information. The image processing unit 109 may be a dedicated hardware circuit such as an application specific integrated circuit (ASIC) designed so as to realize a specific function, for example. Alternatively, the image processing unit 109 may be configured to realize a specific function by a processor such as a digital signal processor (DSP) or a graphics processing unit (GPU) executing software. The image processing unit 109 outputs the obtained or generated information or data to the control apparatus 150 in accordance with intended use.

The image processing that is applied by the image processing unit 109 may include preprocessing, color interpolation processing, correction processing, detection processing, data processing, evaluation value calculation processing, and special effect processing, for example.

The preprocessing may include signal amplification, reference level adjustment, defective pixel correction, A/D conversion, and the like.

The color interpolation processing is performed in a case where color filters are provided in the image sensor, and is processing for interpolating the values of color components that are not included in individual pieces of pixel data that make up image data. The color interpolation processing is also called "demosaic processing".

The correction processing may include processing such as white balance adjustment, tone correction, correction (e.g., image recovery) of image deterioration caused by optical aberration of the image forming lens 104, correction of influence from limb darkening of the image forming lens 104, color correction, and the like.

The detection processing may include detection of a feature region (for example, a face region or a human body region) and detection of movement of such a feature region, processing for recognizing a person, and the like.

The data processing may include processing such as extraction (e.g., cropping) of a region, synthesis, scaling, encoding and decoding, and header information generation (e.g., data file generation). Generation of image data to be displayed and image data to be recorded is also included in the data processing.

The evaluation value calculation processing may include processing such as generation of signals and evaluation values to be used for automatic focus detection (AF), and generation of evaluation values to be used for automatic exposure control (AE).

The special effect processing may include processing such as provision of a blurring or bokeh effect, changing of color tone, and re-lighting.

Note that these are exemplary processing that can be applied by the image processing unit 109, and processing that is applied by the image processing unit 109 is not limited thereto.

According to the present embodiment, the image sensor of the image capture unit 108 can output image signals for executing imaging plane phase difference AF, and the image processing unit 109 calculates a defocus amount and a defocus direction as the evaluation value calculation processing. Note that the image processing unit 109 may obtain the defocus amount and the defocus direction using another AF method such as contrast AF or phase difference AF that uses a dedicated AF sensor. The defocus amount and the defocus direction can be respectively converted into a drive amount and a drive direction of the focus lens.

Furthermore, the image processing unit 109 executes AE processing based on an AE evaluation value, and determines an exposure condition (shooting parameter). Note that, if the aperture value changes while a moving image is being captured, the depth of field changes. For this reason, when the brightness of a captured area changes, the image processing unit 109 changes at least one of the imaging sensitivity and the exposure time without changing the aperture value in AE processing.

The control apparatus 150 is a processor (e.g., a CPU, an MPU, a microprocessor, etc.) that can execute a program, for example. The control apparatus 150 controls operations of the camera 11 that includes the lens unit 160 by loading a program stored in a ROM 152 to a RAM 151 and executing the program, and realizes functions of the camera 11.

In FIG. 2, the functional blocks included in the control apparatus 150 represent main functions in the present embodiment, from among various functions realized by the control apparatus 150. Therefore, operations of a target focus distance designation unit 110, a video focus control unit 112, a camera focus control unit 113, and a background distance obtaining unit 119 are actually executed by the control apparatus 150. Note that at least one of the target focus distance designation unit 110, the video focus control unit 112, the camera focus control unit 113, and the background distance obtaining unit 119 may be mounted as a hardware circuit.

The ROM 152 is a rewritable non-volatile memory, and stores a program that is executed by the control apparatus 150, various setting values of the camera 11, GUI data, and the like. The RAM 151 is used to read a program that is executed by the control apparatus 150, and to primarily store variables and the like when a program is executed. The RAM 151 may also be used as a buffer memory for image data and the like, or a video memory for storing image data to be displayed.

The target focus distance designation unit 110 determines a target focus distance (target distance between the camera 11 and an object whose image, in which the object is in focus, is to be obtained) of the camera 11 (the lens unit 160). When an operation on the focus ring 101 is enabled, the target focus distance designation unit 110 determines a target focus distance in accordance with a defocus amount calculated by the image processing unit 109 and/or an operation performed on the focus ring 101. An autofocus mode or a manual focus mode can be set for the camera 11. In addition, it is possible to set whether to enable or disable an operation on the focus ring 101 in the autofocus mode.

When the manual focus mode is set, the target focus distance designation unit 110 determines, as a target focus distance, a focus distance obtained by reflecting an operation on the focus ring 101 on the current focus distance, for example. On the other hand, when the autofocus mode is set (an operation on the focus ring 101 is enabled), the target focus distance designation unit 110 determines, for example, a focus distance corresponding to the defocus amount calculated by the image processing unit 109, as a target focus distance. In addition, when an operation performed on the focus ring 101 is detected, the target focus distance is adjusted in accordance with the operation on the focus ring 101. In addition, when the autofocus mode is set (an operation on the focus ring 101 is disabled), the target focus distance designation unit 110 determines a target focus distance corresponding to the defocus amount calculated by the image processing unit 109. At this time, for example, a specific object region (for example, a face region) is detected, and a distance equivalent to a defocus amount for the detected region may be used as a target focus distance.

Note that, here, in either the autofocus mode or the manual focus mode, the focus distance of the camera 11 at a time point when the user clearly gave an instruction, such as when an operation was performed on a submit button included in operation unit of the camera 11, is determined as a target focus distance. However, a target focus distance may be determined on another condition. If the focus distance has not been changed for a certain period after the operation on the focus ring 101 was stopped, for example, the focus distance of the camera 11 at this time point may be determined as a target focus distance. Alternatively, a target focus distance may be changed in real time, subsequent to a change in the focus distance.

The video focus control unit 112 and the camera focus control unit 113 constitute a focus control unit 111. The video focus control unit 112 determines a focus distance of a background image based on a target focus distance from the target focus distance designation unit 110 and a background distance from the background distance obtaining unit 119, and transmits the determined focus distance to a video generation unit 201 of the display apparatus 12. The video generation unit 201 has functions of the image generation apparatus 20 and the display control apparatus 21 in FIGS. 1A and 1B. The video generation unit 201 generates a background image (CG) using the focus distance of the background image supplied from the video focus control unit 112.

The camera focus control unit 113 determines a focus distance of the lens unit 160 based on the target focus distance from the target focus distance designation unit 110 and the background distance from the background distance obtaining unit 119. The camera focus control unit 113 gives an instruction regarding the determined focus distance to the lens control unit 107. Note that the aperture value of the diaphragm 103 can also be changed by the camera focus control unit 113 notifying the lens control unit 107 of the aperture value.

The background distance obtaining unit 119 outputs the background distance to the focus control unit 111. The background distance is a distance between the camera 11 and the display apparatus 12 (display screen). In the present embodiment, the distance between the camera 11 and the display apparatus 12 is fixed. For this reason, the background distance obtaining unit 119 outputs the fixed distance that has been set in advance based on the installation positions of the camera 11 and the display apparatus 12. Note that, if the distance between the camera 11 and the display apparatus 12 is changeable, the background distance obtaining unit 119 can measure the background distance using any known method.

When the image processing unit 109 generates a defocus map, for example, the background distance obtaining unit 119 can obtain a background distance based on the defocus map. The defocus map has a format of a two-dimensional image, and the individual pixel values thereof indicate object distances at the corresponding positions. The image background distance obtaining unit 119 detects a defocus amount of the display apparatus from the defocus map, and can obtain a background distance based on the detected defocus amount and the current focus distance. A defocus amount whose frequency is the highest can be detected as a defocus amount of the display apparatus, for example. In addition, the current focus distance can be recognized by obtaining the focus lens position from the lens unit 160.

The display apparatus 12 includes the video generation unit 201 and a video display unit 202. The video generation unit 201 generates CG of a 3D model of a scene set in advance, as viewed from the viewpoint of the same position and orientation as those of the camera 11. A CG of a scene focused at a target focus distance determined by the target focus distance designation unit 110 can be generated by using the focus distance of a background image as a virtual focus distance. When generating CG, the blur effect is applied to the respective 3D articles present in the scene with a degree or amount being in accordance with the distance from the target focus distance. The video display unit 202 is a display panel, and displays CG (background image) generated by the video generation unit 201.

Figure 3B:
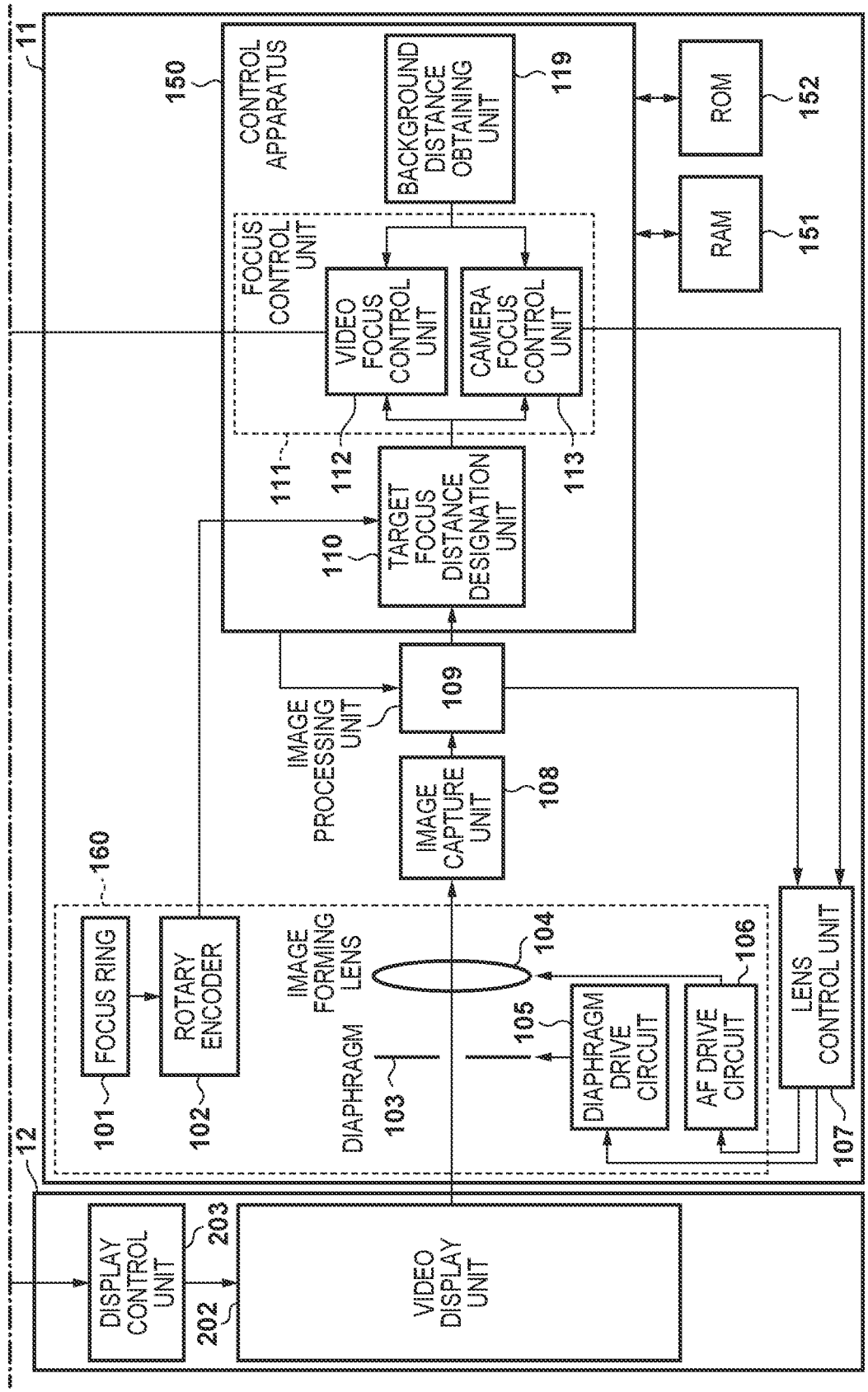

FIGS. 3A and 3B are block diagrams showing an exemplary functional configuration of the devices shown in FIG. 1B. Note that, for ease of description and understanding, in FIGS. 3A and 3B, the display apparatus 12 has a function equivalent to the display control apparatus 21. In addition, the cameras 11 and 16 are fixed at given positions and orientations. In addition, the camera 16 is installed in the same orientation and at the same height of the image capturing position as the camera 11 in order to capture an image that does not give a feeling that something is amiss, as a background of a scene that is captured by the camera 11, for example.

In FIGS. 3A and 3B, the camera 16 that captures a background video has a functional configuration similar to that of the camera 11. Therefore, as description of functional blocks of the camera 16, description of the functional blocks of the camera 11 that have the same names is used.

In FIGS. 3A and 3B, the video focus control unit 112 of the camera 11 transmits the focus distance of a background video to a target focus distance designation unit 310 of the camera 16, instead of the video generation unit 201 of the display apparatus 12. In addition, an image processing unit 309 of the camera 16 generates background image data to be displayed on the display apparatus 12, and outputs the background image data to the display apparatus 12.

With the configuration in FIGS. 3A and 3B, there is no need to generate CG, and thus the display apparatus 12 includes a display control unit 203 that has functions similar to those of the display control apparatus 21. Note that the display apparatus 12 may include the video generation unit 201 similarly to FIG. 2. In this case, the video generation unit 201 displays a received video on the video display unit 202 without generating CG.

When the camera 11 is connected to the camera 16, the camera 16 operates using, as a target focus distance, the focus distance of a background video received from the camera 11. For this reason, when the camera 11 is connected to the camera 16, an operation performed on the focus ring 101 of the camera 16 and an AF operation may be basically disabled. Note that the control apparatus 150 can detect whether or not the camera 11 is connected to the camera 16, using a known method suitable for the connection method. In a case of wired connection, for example, it is possible to detect whether or not a device is connected to the camera, based on the voltage of a predetermined terminal of a connector for connection to a cable.

FIGS. 4A to 4D are schematic diagrams of video representation that can be realized according to the present embodiment. FIG. 4A is a schematic diagram of the virtual studio shown in each of FIGS. 1A and 1B as viewed from the side. A virtual object 15 schematically represents the position of the virtual object 14 in a virtual space, the virtual object 14 being displayed on the display apparatus 12, and the virtual object 15 is not present behind the display apparatus 12.

FIGS. 4B to 4D schematically show how the real object 13 and the virtual object 14 in a video captured by the camera 11 blur. FIG. 4B shows a video for which the camera 11 is focused on both the real object 13 and the virtual object 14. Such a video is obtained when the distance between the display apparatus 12 and the real object 13 is short, or when the aperture value of the lens unit 160 is large, for example.

FIG. 4C shows a video in which the real object 13 is in focus, but the virtual object 14 blurs. Such a video is obtained when the distance between the display apparatus 12 and the real object 13 is long, or when the aperture value of the lens unit 160 is small, for example. In the present embodiment, a case is envisioned in which the virtual object 14 is displayed on the display apparatus 12, but, if a scenery of a town or the like is used as a background image, a video such as that in FIG. 4C may be captured.

FIG. 4D shows a video in which the virtual object 14 is in focus, but the real object 13 blurs. Conventionally, the video shown in FIG. 4D has been difficult to capture. This is because, in a virtual space, the virtual object 15 is positioned on the rear side relative to the display apparatus 12. Accordingly, when the camera 11 is focused on the position of the virtual object 15 in the virtual space (virtual distance), the virtual object 14 displayed on the display apparatus 12 will also blur.

In order to obtain a video such as that shown in FIG. 4D, it is necessary for the camera 11 to be focused on the display apparatus 12 while generating a background image in which the virtual object 15 is in focus. The method disclosed in Japanese Patent Laid-Open No. 2022-102923 described above is for synchronizing the focus distance of the camera 11 and the focus distance of a background image with each other, and thus it is not possible to obtain a video such as that shown in FIG. 4D, in which the focus distance of the camera 11 and the focus distance of the background image need to be different.

Control Operation of Focus Distance

Next, a control operation of a focus distance according to the present embodiment will be described with reference to the flowchart shown in FIG. 5. Operations to be described below can be realized by the control apparatus 150 executing a program, but, for convenience, description will be given assuming that the operations are performed by the focus control unit 111. The following operations can be executed, for example, in accordance with the target focus distance designation unit 110 determining a target focus distance.

In step S11, the focus control unit 111 obtains a background distance from the background distance obtaining unit 119.

In step S12, the focus control unit 111 obtains a target focus distance from the target focus distance designation unit 110. The target focus distance is a distance between the camera 11 and an object whose image, in which the object is in focus, is to be obtained.

In step S13, the focus control unit 111 determines whether or not the obtained target focus distance is shorter than or equal to the background distance (whether the display apparatus 12 or the object that is on the front side relative to the display apparatus 12 is to be in focus). The focus control unit 111 executes step S14 if it is determined that the target focus distance is shorter than or equal to the background distance, and executes step S15 if not.

In step S14, the camera focus control unit 113 outputs the target focus distance as a camera focus distance to the lens control unit 107. In this manner, the camera focus control unit 113 controls the camera 11 so as to be focused at the target focus distance, when the object desired to be in focus is positioned at the same distance as or in front of the display apparatus 12.

In step S15, the camera focus control unit 113 outputs a distance based on the background distance as a camera focus distance to the lens control unit 107. The distance may be a distance separated from the background distance by a predetermined distance being not less than 0. This is because an in-focus image of the background image can be obtained by not adjusting the focus distance of the camera 11 strictly to the background distance. In addition, e.g., in order for a visual effect, a focus distance may be shifted from the background distance so that a background image may be slightly blurred. Accordingly, hereinafter, the "background distance" used to adjust a focus distance is intended to mean "a distance based on the background distance". In this manner, when an object desired to be in focus is positioned on the rear side relative to the display apparatus 12, the camera focus control unit 113 controls the camera 11 so as to be focused on the display apparatus 12.

In step S16, the video focus control unit 112 outputs the target focus distance as a focus distance of a background image to the display apparatus 12. The video generation unit 201 of the display apparatus 12 generates CG of the background image by rendering a 3D model so as to be focused at the target focus distance. The position and orientation of a virtual camera used when rendering the 3D model are equal to the position and orientation of the camera 11, and thus the target focus distance can be used as is for generating CG.

Note that the operations shown in the flowchart in FIG. 5 can also be applied in the manual focus mode in a similar manner. In step S12, the focus control unit 111 obtains a target focus distance determined by performing an operation on the focus ring 101. At this time, even if a target focus distance is about to be set to an area on the rear side relative to the display apparatus 12 (farther than the background distance), the background distance is output as a camera focus distance to the lens control unit 107. Accordingly, it is possible to perform control such that the camera focus distance does not exceed the background distance.

Note that, in the case of the configuration shown in FIGS. 3A and 3B, the video focus control unit 112 outputs the target focus distance to the camera 16. A camera focus control unit 313 of the camera 16 outputs the target focus distance to a lens control unit 307, and controls the focus distance of the camera 16 so that the camera 16 is in-focus at the target focus distance.

In this manner, control is performed such that the background image is focused at the target focus distance, and the focus distance of the camera 11 that captures an image of an object differs according to the size relationship between the target focus distance and the background distance. Specifically, if the target focus distance is longer than the background distance, the focus distance of the camera is used as a background distance, otherwise the focus distance of the camera is used as a target focus distance. Accordingly, it is possible to realize a background image focused on a virtual object that is present in an area farther than the display apparatus while a real object that is present in front of the display apparatus is blurred.

Variation 1

Note that, when a target focus distance is longer than a background distance, and the focus distance of the camera 11 is used as a background distance, the amount of a blur of an image of the real object 13 can be insufficient if the distance between the display apparatus 12 and the real object 13 is short. In addition, regarding the target focus distance that is longer than the background distance, the amount of a blur of the real object 13 is constant irrespective of the target focus distance, and thus an unnatural impression may be given.

For this reason, when a target focus distance is longer than a background distance, the amount of a blur corresponding to the target focus distance can be added to an image of the real object 13. This processing will be described with reference to the flowchart shown in FIG. 6. This processing can be executed as a portion of the processing of step S15 in FIG. 5, for example.

In step S22, the control apparatus 150 detects a real object. A method for detecting a real object is not particularly limited, but a configuration can be adopted in which the image processing unit 109 generates a defocus map, and a region in the defocus map in which a focus distance is shorter than the background distance can be detected as an image region of a real object. Alternatively, a configuration may also be adopted in which a specific object region (for example, a human body region) is detected by the image processing unit 109, and, based on the defocus amount of the detected object region, an object region that is present on the front side relative to the background distance is detected as a region of the real object.

In step S23, the control apparatus 150 obtains an actual defocus amount of the real object. This defocus amount is a defocus amount when the focus lens is at a reference position. When the defocus map generated by the image processing unit 109 indicates a defocus amount for when the focus lens is at the reference position, the defocus amount can be used as an actual defocus amount as is. On the other hand, when the defocus map indicates a relative defocus amount to a focus lens position other than the reference position, the control apparatus 150 converts the defocus amount of the defocus map into an actual defocus amount for the reference position.

In step S24, the control apparatus 150 calculates a necessary defocus amount for the real object. The necessary defocus amount is a defocus amount for the real object region in a state where the camera 11 is focused at a target focus distance. The necessary defocus amount can be obtained by converting a distance obtained by subtracting the distance between the camera 11 and the real object from the target focus distance.

In step S25, the control apparatus 150 calculates a correction defocus amount for the real object. The amount of defocus that is insufficient is obtained by subtracting the actual defocus amount from the necessary defocus amount.

In step S26, the control apparatus 150 controls the image processing unit 109 so as to apply the blur effect that is based on the correction defocus amount, to the real object region in a video captured by the image capture unit 108. Blurring can also be added by decreasing the aperture value of the diaphragm 103, but, when it is desirable that there is no change in the shooting parameter, the image processing unit 109 adds the blur effect.

When blurring by opening the diaphragm 103, and the correction defocus amount is twice the actual defocus amount, the aperture value of the diaphragm 103 can be halved. The diaphragm, which was initially set to F5.6, is opened to F2.8, for example. This is because a blur diameter d, a defocus amount def, and an aperture value F satisfy the relation of the blur diameter d=the defocus amount def/the aperture value F, and thus, when blur equivalent to the doubled defocus amount def is required, F-number needs to be halved.

In addition, when blurring through image processing, the blur diameter d obtained based on the above expression can be converted into the number of pixels by being divided by a pixel pitch, so as to determine a parameter of the Gaussian filter for providing the blur effect. By applying Gaussian filtering processing to a real object region, it is possible to apply a blur effect to the real object region.

Variation 2

If a focus distance of a background image and a focus distance of a camera are individually controlled, there are cases where timings of changes in the focus distances differ, and an in-camera VFX image gives an unnatural impression. For this reason, in this variation, the focus distance of the background image and the focus distance of the camera are controlled in cooperation. Accordingly, it is possible to obtain an in-camera VFX video in which the focus distance of the background image and the focus distance of the camera naturally change.

FIG. 7A shows a case where a target focus distance that is closer than a background distance changes to a state of being farther than the background distance, and FIG. 7B shows a case where a target focus distance that is farther than a background distance changes to a state of being closer than the background distance. FIG. 7A can be executed as step S15 and subsequent step S16 in FIG. 5, and FIG. 7B can be executed as step S14 and subsequent step S16 in FIG. 5.

When a target focus distance that is shorter than or equal to a background distance is changed to a state of being longer than the background distance, the video focus control unit 112 and the camera focus control unit 113 control the focus distance in cooperation from the target focus distance before being changed, to the background distance, in step S33 in FIG. 7A. Specifically, the video focus control unit 112 and the camera focus control unit 113 perform control such that the focus distance of the background image and the focus distance of the camera 11 change at the same speed.

For example, the video focus control unit 112 and the camera focus control unit 113 divide the difference between the target focus distance before being changed and the background distance into a plurality of sections, and change the focus distance section by section, for example. At this time, the timings when the video focus control unit 112 and the camera focus control unit 113 perform notification of the focus distance may be synchronized.

When the focus distance of the background image and the focus distance of the camera reach the background distance, the video focus control unit 112 changes the focus distance of the background image to the changed target focus distance in step S34. Also at this time, similarly to step S33, the difference between the background distance and the changed target focus distance may be divided into a plurality of sections such that the focus distance of the background image is changed in a stepwise manner. In addition, the length of one section may be the same as the length of one section in step S33 such that a change in the focus distance of the background image corresponds to a change in the focus distance in step S33.

In addition, when a target focus distance that is longer than a background distance is changed to a state of being shorter than or equal to the background distance, the video focus control unit 112 changes the focus distance of the background image from the focus distance before being changed, to the background distance, in step S43 in FIG. 7B. Since the target focus distance before being changed is longer than the background distance, the camera 11 is focused at the background distance. For this reason, in step S43, the focus distance of the camera 11 does not change.

When the focus distance of the background image reaches the background distance, the video focus control unit 112 and the camera focus control unit 113 control the focus distance in cooperation from the background distance to the changed target focus distance, in step S44. Specifically, the video focus control unit 112 and the camera focus control unit 113 perform control such that the focus distance of the background image and the focus distance of the camera 11 change at the same speed. Here, a control method of the focus distance may be the same as that in step S33.

Note that, also in step S43, similarly to step S44, the difference between the target focus distance before being changed and the background distance may be divided into a plurality of sections, such that the focus distance of the background image is changed in a stepwise manner. In addition, the length of one section may be the same as the length of one section in step S44 such that a change in the focus distance of the background image corresponds to a change in the focus distance in step S44.

Note that, here, a case is envisioned in which a target focus distance is discontinuously changed across a background distance, but similar control can also be performed in a case where a target focus distance is continuously changed subsequent to an operation performed on the focus ring 101. In this case, when the target focus distance is in a range of being shorter than or equal to a background distance, the video focus control unit 112 and the camera focus control unit 113 perform control in cooperation, and when the target focus distance is within a range of exceeding the background distance, it suffices for the video focus control unit 112 to execute control of only the focus distance of a background image. Accordingly, it is possible to obtain a VFX video in which the focus distance naturally changes.

According to the present embodiment, also when a focus distance of a background image is changed in accordance with settings of a focus distance of an image capture apparatus that captures an in-camera VFX video, and the focus distance is set on the rear side relative to a display apparatus that displays the background image, an appropriate VFX video can be obtained. In addition, by adding a blur effect to an image of a real object in accordance with a target focus distance, when a focus distance is set on the rear side relative to a display apparatus that displays a background image, it is possible to obtain a VFX video in which the real object on the front side is naturally blurred.

Second Embodiment

Next, a second embodiment of the present disclosure will be described. In the first embodiment, description has been given on focus control that is performed on a target focus distance designated by the user. The present embodiment is directed to focus control in a case where a distance at which the camera 11 is focused on a detected object is automatically determined as a target focus distance.

When a target focus distance is determined based on a detected object, focus control needs to be switched in accordance with whether the detected object is a real object or a virtual object. In addition, the distance to a virtual object that is obtained from a camera is a background distance only, and it is not possible to obtain a distance corresponding to the position of the virtual object in a virtual space. Therefore, with the camera 11, it is not possible to obtain a distance at which the virtual object 15 shown in FIG. 4A is in focus.

The focus distance of the virtual object 15 can be obtained from an apparatus that generates CG of a background image (e.g., a video generation apparatus 20 or the video generation unit 201), or a camera that captures a background image.

Figure 8:
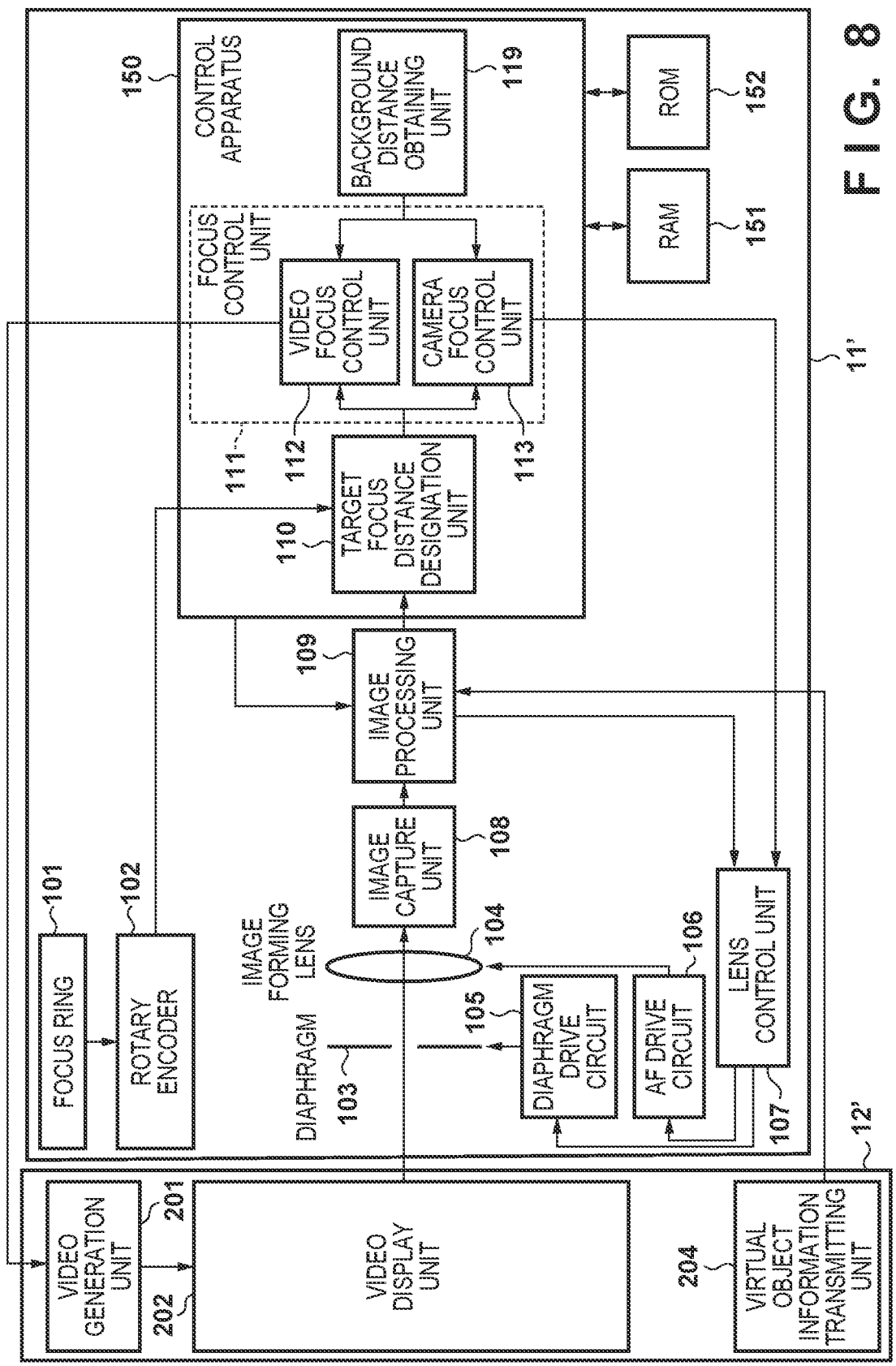
FIG. 8 is a block diagram showing an exemplary functional configuration of devices that realize a virtual studio according to a second embodiment.

FIGS. 8 and 9 are block diagrams showing an exemplary functional configuration of a camera and a display apparatus that constitute a virtual studio system according to the present embodiment. The same constituent elements as those of the cameras and the display apparatuses described in the first embodiment are given the same reference numerals as those in FIGS. 2 and 3, and overlapping description is omitted.

In the configuration in FIG. 8 for generating a background image (CG), a virtual object information transmitting unit 204 is added to a display apparatus 12'. In addition, FIGS. 9A and 9B include a configuration in which virtual object information is transmitted from the image processing unit 309 of a camera 16' to the image processing unit 109 of a camera 11'. Note that, in this specification, communication between cameras and communication between camera display apparatuses are performed through an interface that complies with any standard suitable for signals that are transmitted/received. Examples of representative standards that can be used for communication can include serial digital interface (SDI), HDMI (registered trademark), USB, and wireless LAN standards, but there is no limitation.

Determination is performed as to whether an object detected by the image processing unit 109 is a real object or a virtual object, and if the detected object is a virtual object, virtual object information is supplied to the camera 11 in order to make it possible to obtain the focus distance of the virtual object. The virtual object information includes, for each specific object that is present in the virtual space, information regarding the position (e.g., two-dimensional position) in a background image and the distance (e.g., focus distance) in the virtual space. Here, it is assumed that a specific object is a person object, but there may be any one or more types of specific objects that can be detected by the image processing unit 109. If there may be a plurality of types of virtual objects, the virtual object information includes information regarding the types for the respective virtual objects.

With the configuration in FIG. 8, as a background image, a three-dimensional model of a virtual space rendered by the video generation unit 201 includes a virtual object. For this reason, the video generation unit 201 can obtain information regarding the position and distance of the virtual object. The video generation unit 201 outputs virtual object information regarding a predetermined type of object to the camera 11' via the virtual object information transmitting unit 204.

The camera 11' supplies the virtual object information received from the display apparatus 12', to the image processing unit 109. The image processing unit 109 executes object detection processing on a type of object set in advance, for example, and obtains detection results such as a position, a size, and a detection reliability for each object region that has been detected. The image processing unit 109 can then determine whether a detected object region is a region of a real object or a region of a virtual object, based on the supplied virtual object information. In addition, the image processing unit 109 can also obtain a focus distance of the region of the virtual object in the virtual space, based on the virtual object information.

Figure 9A:
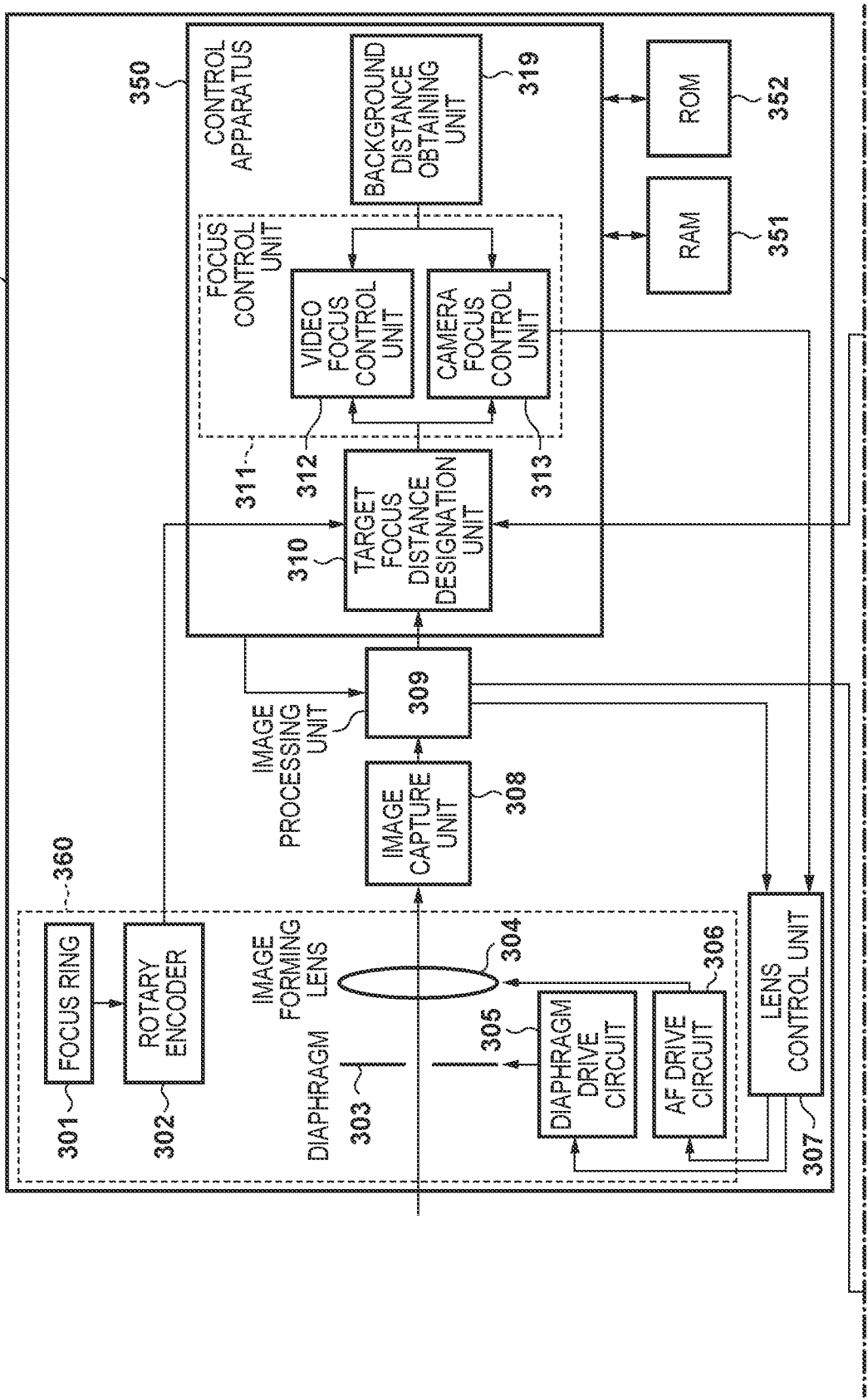
FIGS. 9A and 9B are block diagrams showing another exemplary functional configuration of devices that realize the virtual studio according to the second embodiment.
Figure 9B:
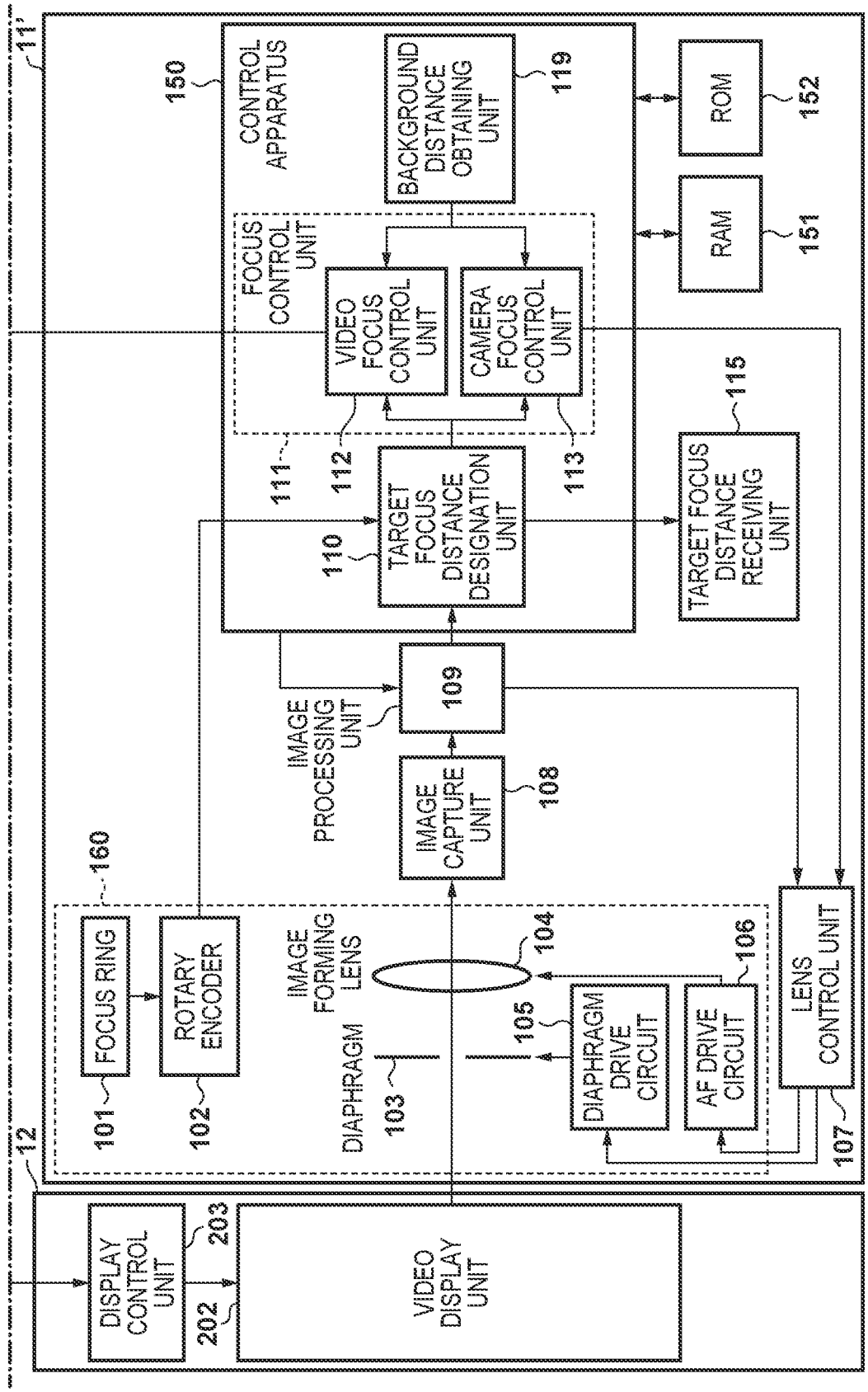

With the configuration in FIGS. 9A and 9B in which a background image is captured by the camera 16', for example, the image processing unit 309 of the camera 16' executes object detection processing that is similar to the processing performed by the image processing unit 109 of the camera 11, and obtains an object detection result. A defocus amount is then obtained as information regarding a focus distance for each detected object region. The defocus amount may be converted into a distance. The image processing unit 309 then outputs, to the camera 11', object detection results that include information regarding focus distances related to individual object regions. Processing that is performed on the camera 11' side has been described with reference to FIG. 8.

A focus control operation in which a focus distance of an object region detected by the camera 11' is used as a target focus distance will be described with reference to the flowchart shown in FIG. 10. Note that, here, operations of the camera 11' will be described, but virtual object information is periodically (for example, for each predetermined number of frames) supplied from the display apparatus 12' (FIG. 8) and the camera 16' (FIG. 9A) to the camera 11'.

In step S51, the image processing unit 109 applies object detection processing to a frame image of a moving image for live-view display obtained from the image capture unit 108, for example. Here, the face region of a person is detected in object detection processing, but, as described above, any type of object may be detected. In the case of the configuration shown in FIGS. 9A and 9B, an object that is detected may be any object that can be detected by both the image processing unit 109 and the image processing unit 309 of the camera 16'.

In step S52, the image processing unit 109 selects a main object region from one or more object regions detected in step S51. If one object region is detected in step S51, the detected object region is used as a main object region as is. When a plurality of object regions are detected, the image processing unit 109 can select a main object region in accordance with a predetermined condition that is based on the size, position, and the like of a region. The image processing unit 109 can select, as a main object region, an object region that is closest to the center of an image, or the largest object region, for example. In addition, in a case of a face region, the face region of a specific individual may be selected as a main object region. In addition, when a main object region is switched at a specific timing such as during movie shooting, a main object region that is selected may be switched in accordance with a time that has elapsed from when shooting started.

In step S53, the image processing unit 109 obtains virtual object information. Note that the virtual object information may be obtained by the camera 11' requesting it from the display apparatus 12' or the camera 16', or may be periodically transmitted from the display apparatus 12' or the camera 16' to the camera 11'. Here, the memory of the RAM 151 or the image processing unit 109 stores the most recently received virtual object information.

In step S54, the image processing unit 109 determines whether the selected main object region is a region of a real object or a region of a virtual object, by referring to the virtual object information. If the virtual object information includes information regarding a virtual object region corresponding to the main object region, the image processing unit 109 can determine that the main object region is a region of a virtual object.

In step S54, the image processing unit 109 executes step S55 if it is determined that the main object region is a region of a virtual object, and executes step S59 if not.

In step S55, the image processing unit outputs the focus distance of the main object region (e.g., the focus distance in the virtual space) to the target focus distance designation unit 110. The target focus distance designation unit 110 then determines a focus distance output by the image processing unit 109, as a target focus distance.

In step S56, the focus control unit 111 determines whether or not the current focus distance is shorter than or equal to a background distance, and executes step S57 if it is determined that the current focus distance is shorter than or equal to the background distance, and executes step S58 if not.

In step S57, for example, the focus control unit 111 controls focus distances of the background image and the camera 11' as described with reference to FIG. 7A.

When step S58 is executed, the current focus distance of the camera 11' is a background distance. For this reason, the video focus control unit 112 controls the focus distance of the background image to be in-focus at the target focus distance. The camera focus control unit 113 does not change the focus distance.

In step S59, the image processing unit 109 obtains a focus distance for the main object region that is a region of a real object. The image processing unit 109 obtains a relative defocus amount to the current focus distance, and converts the relative defocus amount into an actual defocus amount corresponding to the absolute distance between the camera 11' and the main object. The image processing unit 109 further converts the actual defocus amount into a distance, and outputs the resultant as a focus distance to the target focus distance designation unit 110.

In step S60, the focus control unit 111 determines whether or not the current focus distance is shorter than or equal to the background distance, and executes step S62 if it is determined that the current focus distance is shorter than or equal to the background distance, and executes step S61 if not.

In step S61, the focus control unit 111 controls the focus distances of the background image and the camera 11', for example, as described with reference to FIG. 7B.

In step S62, the focus control unit 111 controls the focus distance of the background image and the focus distance of the camera 11' are to be the target focus distance. Note that the camera focus control unit 113 converts the actual defocus amount into a defocus amount that is based on the current focus distance, and outputs the resultant to the lens control unit 107.

According to the present embodiment, in addition to the effects of the first embodiment, also in a virtual studio system, it is possible to automatically set a target focus distance using an object detection function and obtain an in-camera VFX video.

Other Embodiments

In the above embodiments, methods for controlling focus distances of both a camera and a background image have been described, but a configuration may also be adopted in which only a focus distance of a camera is controlled. When a target focus distance is longer than a background distance, simply by fixing a focus distance of a camera to the background distance, it is possible to solve an issue of a conventional technique that a background image is blurred. In this case, for example, it suffices for execution of step S16 in the operations in the flowchart in FIG. 5 to be skipped.

In the above embodiment, description has been given assuming that the camera 11 includes the control apparatus 150, but the control apparatus 150 may be an apparatus independent from the camera 11 and the display apparatus 12. In addition, the control apparatus 150 may also be provided in the display apparatus 12. In addition, some constituent elements of the control apparatus 150 may be provided independently from the camera 11 and the display apparatus 12. A configuration may also be adopted in which, for example, only the focus control unit 111 is provided independently from the camera 11 and the display apparatus 12.

In the present embodiment, a method for determining a background distance in advance and a method for detecting a background distance from a defocus map have been described, but a background distance may be detected using another method. When the camera 11 is hung on a crane, for example, a background distance may be obtained based on crane control parameters. In addition, a configuration may also be adopted in which the orientation of the camera 11 is detected, and a background distance is obtained based on orientation information of the camera 11. In addition, a background distance may be obtained using an active ranging system such as LiDAR.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-017007, filed Feb. 7, 2023, which is hereby incorporated by reference herein in its entirety.

The invention claimed is:

1. A control apparatus for controlling an image capture apparatus, the control apparatus comprising:
one or more processors that execute a program stored in a memory and thereby function as:
an obtaining unit configured to obtain a target focus distance, and
a control unit, wherein the control unit is configured to:
if the target focus distance is longer than a first distance between the image capture apparatus and a display apparatus provided in a captured area of the image capture apparatus, control a focus distance of the image capture apparatus such that the image capture apparatus is in-focus at a second distance determined based on the first distance, and
if the target focus distance is shorter than or equal to the first distance, control the focus distance of the image capture apparatus such that the image capture apparatus is in-focus at the target focus distance.

2. The control apparatus according to claim 1, wherein the control unit controls a generation unit that generates a video to be displayed on the display apparatus using the target focus distance in order to control a focus distance of the video.

3. The control apparatus according to claim 2, wherein, in a case of controlling both the focus distance of the image capture apparatus and the focus distance of the video, the control unit controls so that the focus distance of the image capture apparatus and the focus distance of the video change in synchronization.

4. The control apparatus according to claim 2, wherein, if a current focus distance of the image capture apparatus is longer than the first distance, and the target focus distance is shorter than or equal to the first distance, the control unit first controls the focus distance of the video to the second distance, and then controls the focus distance of the image capture apparatus and the focus distance of the video to the target focus distance.

5. The control apparatus according to claim 2, wherein, if a current focus distance of the image capture apparatus is shorter than or equal to the first distance, and the target focus distance is longer than the first distance, the control unit first controls the focus distance of the image capture apparatus and the focus distance of the video to the second distance, and then controls the focus distance of the video to the target focus distance.

6. The control apparatus according to claim 1, wherein, if the target focus distance is longer than the first distance, the control unit further controls the image capture apparatus so that a region of an object, which is included in a video captured by the image capture apparatus and whose distance is shorter than the first distance, blurs according to a difference between the region and the target focus distance.

7. The control apparatus according to claim 6, wherein the control unit changes a shooting parameter of the image capture apparatus so that the region of an object blurs according to a difference between the region and the target focus distance.

8. The control apparatus according to claim 6, wherein the control unit controls an image processing unit of the image capture apparatus so as to apply a blur effect to the region so that the region of an object blurs according to a difference between the region and the target focus distance.

9. The control apparatus according to claim 1, wherein the target focus distance is set by a user of the image capture apparatus.

10. The control apparatus according to claim 1, wherein the target focus distance is automatically set by the image capture apparatus.

11. A control apparatus, comprising:
one or more processors that execute a program stored in a memory and thereby function as:
a control unit configured to control image capturing that is performed by an image capture apparatus and image displaying that is performed by a display apparatus provided in a captured area of the image capture apparatus,
wherein the control unit controls a focus distance in the image capturing not to be longer than a first distance corresponding to a distance between the image capture apparatus and the display apparatus.

12. A control apparatus, comprising:
one or more processors that execute a program stored in a memory and thereby function as:
an obtaining unit configured to obtain a target focus distance, and
a control unit configured to control image capturing that is performed by an image capture apparatus and image displaying that is performed by a display apparatus provided in a captured area of the image capture apparatus,
wherein the control unit includes:
a generating unit configured to generate a video to be displayed on the display apparatus, using the target focus distance, and
wherein the control unit controls, in accordance with the target focus distance, (i) a focus distance of the image capture apparatus, (ii) a blur effect applied to a video to be displayed on the display apparatus, and (iii) a blur effect applied to a region of an object in a video captured by the image capture apparatus, the region being different from that of the display apparatus.

13. An image capture apparatus comprising:
an image sensor;
an image processing circuit that processes a video captured by the image sensor; and
a control apparatus that controls a focus distance of the image capture apparatus,
wherein the control apparatus comprises:
one or more processors that execute a program stored in a memory and thereby function as:
an obtaining unit configured to obtain a target focus distance, and
a control unit, wherein the control unit is configured to:
if the target focus distance is longer than a first distance between the image capture apparatus and a display apparatus provided in a captured area of the image capture apparatus, control a focus distance of the image capture apparatus such that the image capture apparatus is in-focus at a second distance determined based on the first distance, and if the target focus distance is shorter than or equal to the first distance, control the focus distance of the image capture apparatus such that the image capture apparatus is in-focus at the target focus distance.

14. The image capture apparatus according to claim 13, wherein a focus distance of an object region detected by the image processing circuit is used as the target focus distance.

15. The image capture apparatus according to claim 14, wherein, if the object region is a region of an object included in the video, the target focus distance is set based on information regarding the object included in the video.

16. A control method of an image capture apparatus, the method comprising:

obtaining a target focus distance;

if the target focus distance is longer than a first distance between the image capture apparatus and a display apparatus provided in a captured area of the image capture apparatus, controlling a focus distance of the image capture apparatus such that the image capture apparatus is in-focus at a second distance determined based on the first distance; and if the target focus distance is shorter than or equal to the first distance, controlling the focus distance of the image capture apparatus such that the image capture apparatus is in-focus at the target focus distance.

17. A control method for controlling image capturing that is performed by an image capture apparatus and image displaying that is performed by a display apparatus provided in a captured area of the image capture apparatus, the method comprising:

controlling a focus distance in the image capturing not to be longer than a first distance corresponding to a distance between the image capture apparatus and the display apparatus.

18. A control method comprising:

obtaining a target focus distance; and controlling image capturing that is performed by an image capture apparatus and image displaying that is performed by a display apparatus provided in a captured area of the image capture apparatus, wherein the controlling includes:

generating a video to be displayed on the display apparatus, using the target focus distance, and controlling, in accordance with the target focus distance, (i) a focus distance of the image capture apparatus, (ii) a blur effect applied to a video to be displayed on the display apparatus, and (iii) a blur effect applied to a region of an object in a video captured by the image capture apparatus, the region being different from that of the display apparatus.

19. A non-transitory computer-readable medium, for storing a program which, when executed by a computer, causes the computer to function as a control apparatus comprising:

an obtaining unit configured to obtain a target focus distance, and a control unit, wherein the control unit is configured to:

if the target focus distance is longer than a first distance between the image capture apparatus and a display apparatus provided in a captured area of the image capture apparatus, control a focus distance of the image capture apparatus such that the image capture apparatus is in-focus at a second distance determined based on the first distance, and if the target focus distance is shorter than or equal to the first distance, control the focus distance of the image capture apparatus such that the image capture apparatus is in-focus at the target focus distance.

* * * * *